(12) United States Patent
Brumm

(10) Patent No.: US 6,687,347 B1
(45) Date of Patent: Feb. 3, 2004

(54) PUBLIC TELEPHONE NETWORK

(75) Inventor: Thomas Brumm, Gauting-Koenigswiesen (DE)

(73) Assignee: Siemens Aktiengesellschaft, Munich (DE)

( * ) Notice: Subject to any disclaimer, the term of this patent is extended or adjusted under 35 U.S.C. 154(b) by 165 days.

(21) Appl. No.: 10/048,051

(22) PCT Filed: Jul. 25, 2000

(86) PCT No.: PCT/DE00/02439
§ 371 (c)(1),
(2), (4) Date: Jan. 25, 2002

(87) PCT Pub. No.: WO01/08362
PCT Pub. Date: Feb. 1, 2001

(30) Foreign Application Priority Data

Jul. 26, 1999 (DE) .......................................... 199 34 979

(51) Int. Cl.⁷ ............................................. H04M 11/00
(52) U.S. Cl. ................. 379/93.24; 379/88.12; 379/211.02
(58) Field of Search ............. 379/93.24, 93.01, 379/93.14, 93.17, 67.1, 88.11–88.13, 88.17, 211.02

(56) References Cited

U.S. PATENT DOCUMENTS 5,905,777 A * 5/1999 Foladare et al. ......... 379/93.24
5,944,786 A * 8/1999 Quinn ..................... 379/93.24

FOREIGN PATENT DOCUMENTS

EP 0 920 174 A2 6/1999

OTHER PUBLICATIONS

ETS 300 745–1 Integrated Services Digital Network (ISDN); Message Waiting Indication (MWI) supplementary service; Digital Subscriber Signalling System No. one (DSS1) protocol, Part 1: Protocol specification.
ETS 300 745–2 Integrated Services Digital Network (ISDN); Message Waiting Indication (MWI) supplementary service; Digital Subscriber Signalling System No. one (DSS1) protocol, Part 2: Protocol Implementation Conformance Statement (PICS) proforma specification.
ETS 300 754–1 Integrated Services Digital Network (ISDN); Signalling System No. 7; Transaction Capabilities (TC); Appl. Service Element (ASE) for Message Waiting Indication (MWI) supplementary service; Part 1:Protocol specification.

* cited by examiner

*Primary Examiner*—Wing Fu Chan
(74) *Attorney, Agent, or Firm*—Bell Boyd & Lloyd LLC

(57) ABSTRACT

A public telephone network having a subscriber line for which the additional service feature of call forwarding to a predetermined destination call number is provided, the call forwarding being designed for the purpose of forwarding a Message Waiting Indication and/or an E-mail Waiting Indication.

5 Claims, 3 Drawing Sheets

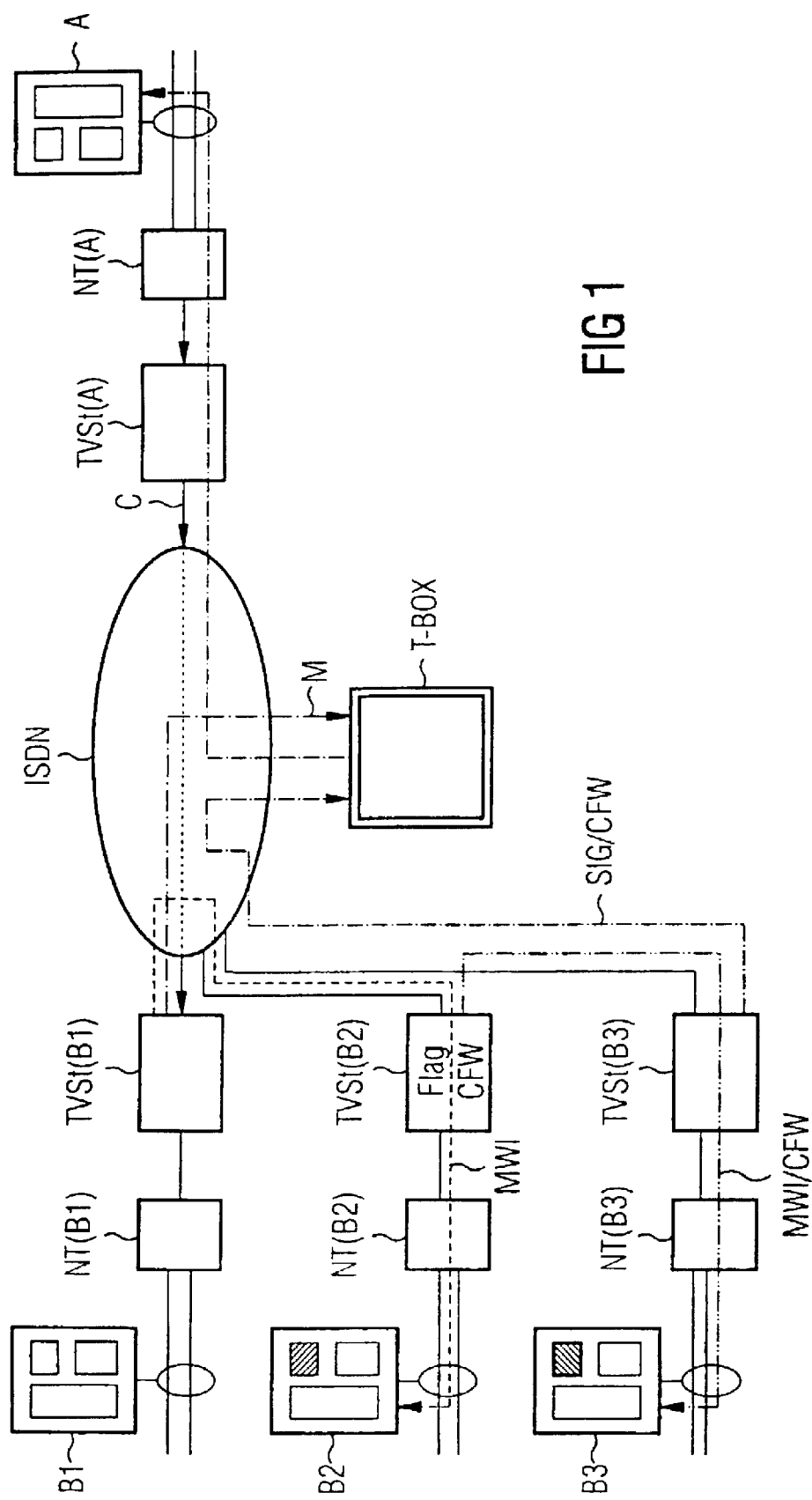

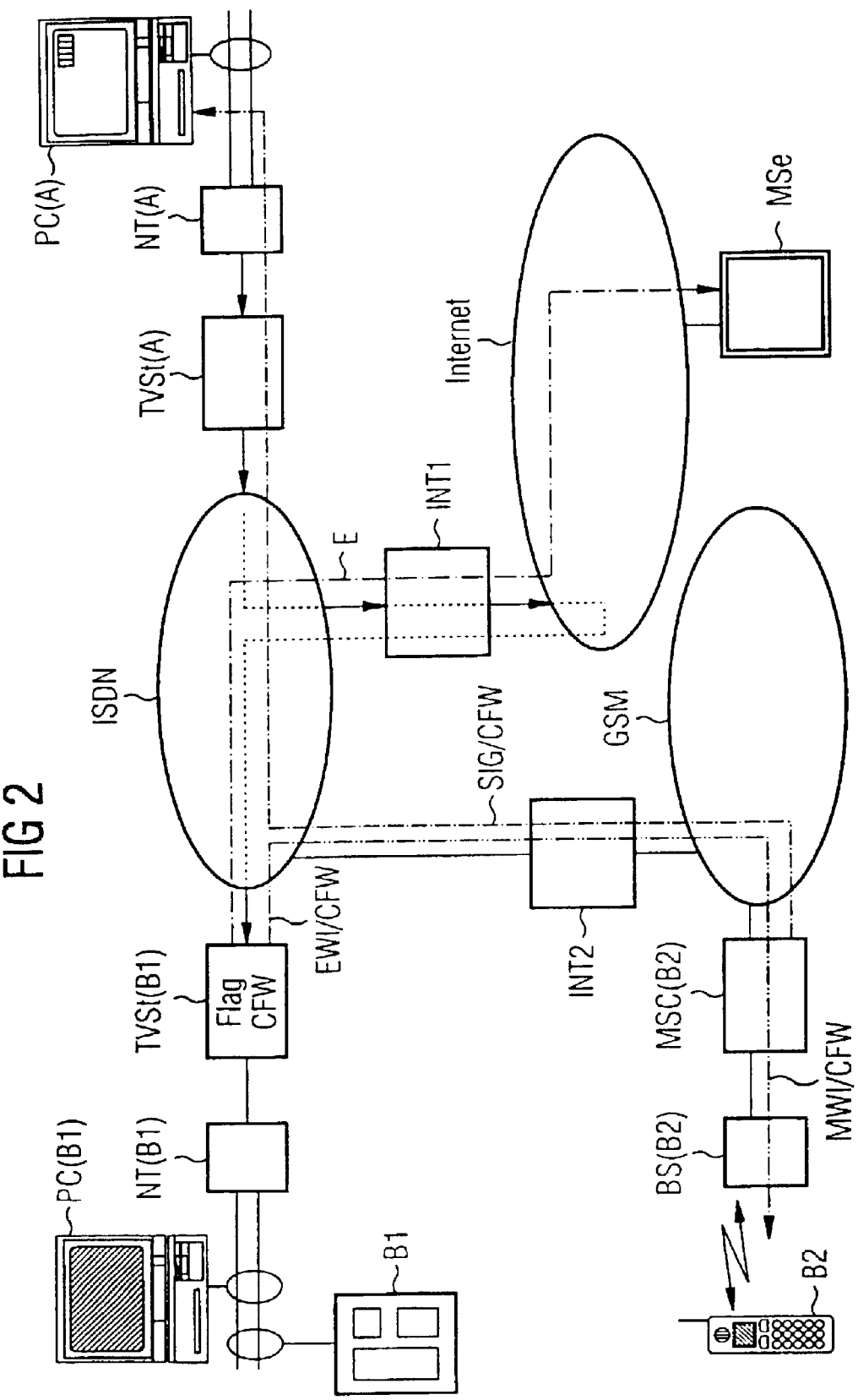

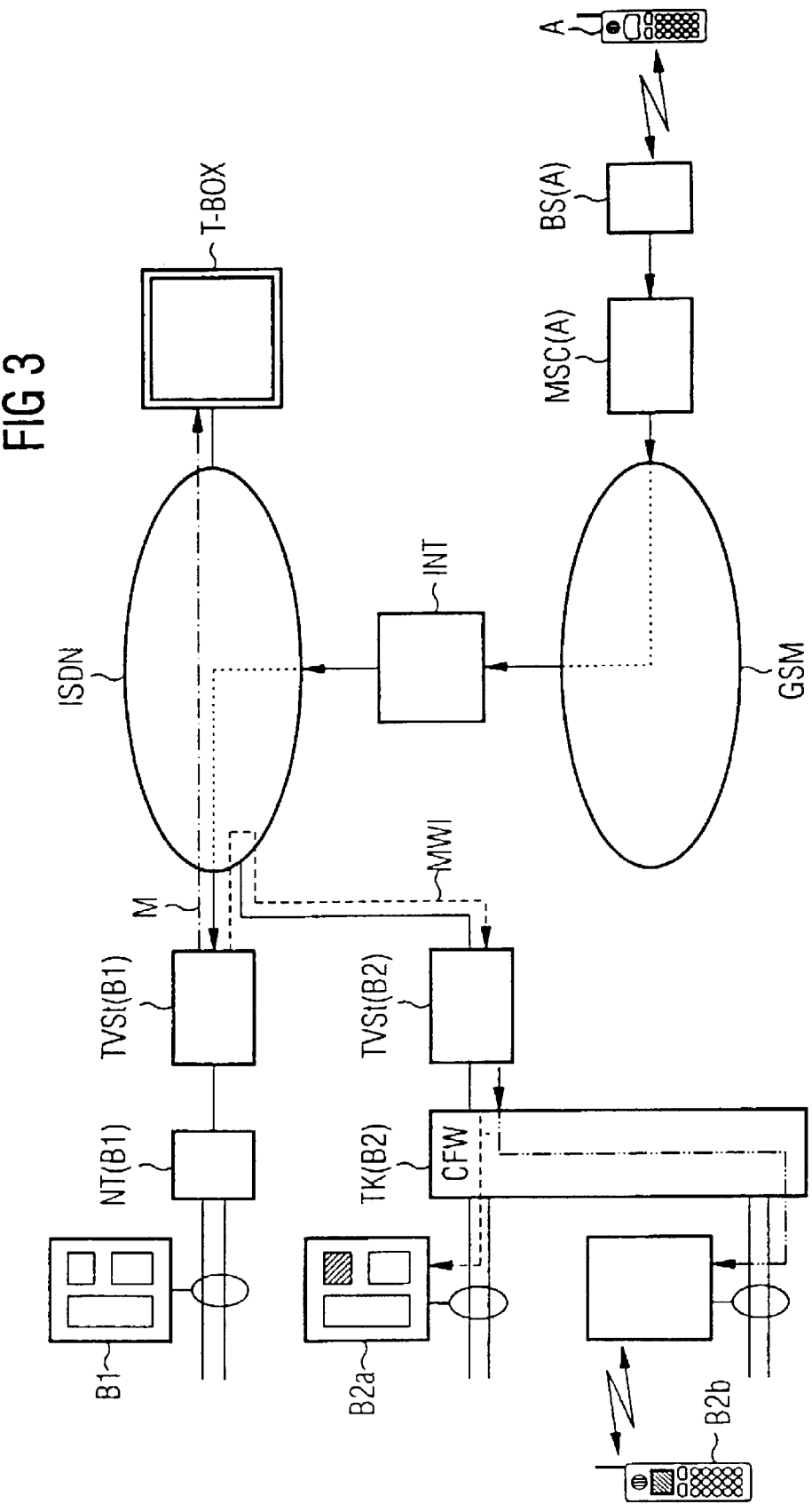

PUBLIC TELEPHONE NETWORK

BACKGROUND OF THE INVENTION

Despite the rapid development of mobile radio networks and the Internet, the line-connected public telephone network (landline network) is still, by far, the most important professional and private source of communication in industrialized countries. In Germany, the public telephone network has almost 50 million subscriber lines connected to approximately 1800 local exchanges and approximately 600 trunk exchanges. With the introduction of the ISDN (Integrated Services Digital Network) on the basis of the digital switching technology of the public telephone network, relevant additional services are provided for owners of ISDN lines. These additional services offered attracted more than 3 million customers for ISDN lines by as early as 1997, and this number continues to increase at a great rate.

The services offered by the (digital) public telephone network need to stake a claim on the market in the face of those offered by the mobile radio networks and the Internet, however, whereby the services offered need to be constantly extended. The providers of the public mobile radio networks are naturally subject to the same compulsion.

Certainly one of the most important services for the subscribers is call forwarding or redirection, which for years has been part of the services offered by the landline network and also by the mobile radio networks and, since the setup of suitable interfaces, has also become possible between these networks.

Another important service which is of central significance for the mobile radio networks, but is also becoming increasingly relevant to the subscribers on the landline network, is the option of storing voice or text messages within the network in a so-called mailbox or telebox. Part of this service is notification of the subscriber about a voice or text message which has been received via a so-called Message Waiting Indication (MWI). The progressive linking of data networks, in particular of the Internet, to the public telephone networks results in the notification of a subscriber about e-mails which he/she has received via a so-called E-mail Waiting Indication (EWI) also gaining increasing practical significance.

The present invention is, therefore, directed toward developing the public telephone network such that the user's utility value associated with voice and text storage in the network and also with services in connection with the transmission of e-mails is increased further.

SUMMARY OF THE INVENTION

The present invention encompasses the fundamental concept of increasing the practical utility value of the service features of Message Waiting Indication and E-mail Waiting Indication by virtue of these service features reaching the user not only on the line on which the relevant voice or text message or e-mail has been received, but also at the location in which he/she is currently situated. It also encompasses the concept of developing the service of call forwarding to this end such that it also permits forwarding of an MWI or EWI.

In preferred embodiments of this invention, interfaces are produced between landline networks and mobile radio networks such that the proposed forwarding is possible in both directions; landline network/mobile radio network and mobile radio network/landline network and also between the mobile radio networks.

One provision within the scope of the present invention is that the exchanges or service switching points in the telephone network contain parts for checking the presence of call forwarding on a subscriber line associated with them in response to the reception of an MWI and/or EWI on this subscriber line. They also contain parts for linking the MWI or EWI to the destination call number which was set within the context of the call forwarding, as well as parts for forwarding the MWI or EWI to the exchange responsible for the destination call number or to the competent service switching point. The use of these parts provides the telephone customer with the same service, in terms of the signaling of an MWI or EWI, on a call forwarding line as on his/her standard line, which distinctly increases the attractiveness of the network's dedicated storage capabilities and, hence, the attractiveness of the network overall.

To prevent a forwarded MWI or EWI from being rejected by the new line's associated list of those mail servers which are authorized to transmit an indication to this line, the forwarded MWI/EWI needs to be provided with an additional flag identifying it as forwarded information. For particular systems, the "Time" field of the report is suitable for this purpose. The flag needs to be set by the exchange or the service switching point for the call forwarding destination line.

In another preferred embodiment of the present invention, signaling parts are provided for acknowledging that the MWI/EWI has been forwarded, or that the forwarding has been unsuccessful or has involved an error, to the mailbox or the originator. In the first case, if an error occurs, it is possible to make a fresh attempt at forwarding; in the latter case, setup of the proposed novel service feature is linked to the additional advantage that each subscriber can, by reason of this, be certain that the other party has actually become aware of the arrival of a message which has been sent from the subscriber to a mailbox in the telephone network. There would, accordingly, be exceptions only in the case of an error, notification of which is explicitly sent to the originator.

In a similar way as in the case of call forwarding from one network line to another, the scope of the present invention is also intended to cover the forwarding of an MWI/EWI from one extension to another in a private branch exchange. This naturally requires that the private branch exchange be appropriately designed as such.

Additional features and advantages of the present invention are described in, and will be apparent from, the following Detailed Description of the Invention and the Figures.

BRIEF DESCRIPTION OF THE FIGURES

FIG. 1 shows a schematic illustration to explain a first exemplary embodiment of the present invention.

FIG. 2 shows a schematic illustration to explain a second exemplary embodiment of the present invention.

FIG. 3 shows a schematic illustration to explain a third exemplary embodiment of the present invention.

DETAILED DESCRIPTION OF THE INVENTION

FIG. 1 is a schematic illustration of how display of a Message Waiting Indication MWI for a voice message M which has been transmitted via the ISDN network ISDN is redirected to a predetermined subscriber line.

A subscriber terminal A directs a call via the associated network termination unit NT(A) and the exchange TVSt(A) associated with the A-subscriber to a B-subscriber, specifically to the call number for the latter's terminal B1, which is connected to the competent exchange TVSt(B1) via the network termination unit NT(B1). If there is no answer, the B-subscriber has activated the T-box in the ISDN network to record a voice message, and in so doing has at the same time specified that the Message Waiting Indication MWI transmitted when the voice message is stored be forwarded (via an appropriate exchange TVSt(B2) and the associated network termination unit NT(B2)) to a second terminal B2 associated with him/her; for example, his/her private line. The "redirection" of the voice message M from the A-subscriber to the T-box is identified by a dash-dot line in FIG. 1, and the transmission of the MWI to the terminal B2 is identified by a dashed line. Hatching of the display (not given a specific designation) on the terminal B2 identifies the fact that the MWI normally appears there after the message M has been received in the T-box.

It is now assumed that the B-subscriber has set, on his/her private terminal B2, call forwarding to another private terminal B3 (which naturally again passes via a competent exchange TVSt(B3) and the appropriate network termination unit NT(B3)). There, a flag is set which identifies it as a forwarded Message Waiting Indication MWI/CFW. The incoming MWI is then redirected to the exchange TVSt(B3) by the call forwarding. Although the call number for the terminal B2 is not contained in the screening list of those mail servers which are authorized to send an indication to the terminal B3, the indication is detected as a forwarded indication on account of the flag which is set, and can pass to the terminal B3. It then appears on the display on the terminal B3, which is identified by a bold border and hatching in the display area. This path of the MWI/CFW is identified by a dash-double-dot line.

After the Message Waiting Indication has been successfully transmitted, the exchange TVSt(B3) transmits appropriate signaling to the A-subscriber, which signaling is symbolized by a double-dash-dot line in FIG. 1. (In the event of an error in the forwarding of the MWI, an error signal would accordingly be transmitted by the competent exchange TVSt(B2) or TVSt(B3)). In this context, it may be pointed out that the anchoring of the acknowledgment function in the ETSI protocol will merely provide signaling to the mailbox. The latter fundamentally represents a private network, whereby the further handling of the message is not covered by the standardization for the public network in that case. The forwarding of the acknowledgment to the calling subscriber which is assumed in this case is therefore only one of a number of options. The simplest option is to ignore the acknowledgment to the mailbox completely, which may result in an MWI or EWI with a misleading content, however. An option which is preferred over this involves the error message in the mailbox being processed internally; for example, by correcting the total number of forwarded Message Waiting Indications or E-mail Waiting Indications to be reported. Finally, provision also may be made for the control parts for the mailbox to initiate repeated transmission of the MWI/CFW or EWI/CFW so that the addressee is still notified in spite of an error which has occurred first.

FIG. 2 shows, as a further example of the implementation of the present invention, an E-mail Waiting Indication (EWI) being handled within the context of call forwarding. An A-subscriber sends an e-mail to a B-subscriber via his/her personal computer PC(A), the associated network termination unit NT(A) and the associated exchange TVSt(A) and also a network interface INT1 between the telephone network ISDN and the Internet. To this end, the A-subscriber logs onto his/her mail server and sends an e-mail from the latter to a network address for another party, the network address again being implemented by a mail server. If the other party is logged onto his/her server, he/she has access to his/her mailbox and receives the e-mail displayed on his/her screen. So that he/she does not need to be logged on constantly in order to be able to receive e-mails reliably, his/her mail server can send him/her an E-mail Waiting Indication to his/her terminal via the public network. It may now be assumed that the B-subscriber has not turned on his/her personal computer PC(B1) in his/her absence and, besides, has set unconditional call forwarding (Call Forwarding Unconditional) CFW on his/her terminal. According to the present invention, the associated exchange TVSt (B1) is designed such that the call forwarding CFW which has been set also detects an incoming E-mail Waiting Indication EWI.

The E-mail Waiting Indication EWI signaling the storage operation in his Internet mailbox for the B-subscriber is forwarded by the exchange TVSt(B1) to the call forwarding destination call number prescribed by the B-subscriber. In the case assumed, this is the call number for a mobile telephone B2 connected to a public mobile radio network GSM. The redirected E-mail Waiting Indication EWI/CFW passes as identified in FIG. 2 (in a similar way to in FIG. 1) by a double-dot-dash line, via an interface INT2 between the landline network ISDN and the mobile radio network GSM, the competent mobile switching center MSC(B2) and the base station BS(B2) associated with the location of the mobile telephone B2 to the mobile telephone B2, where it is displayed on the latter's display. This is identified in FIG. 2 by hatching and a bold border for the display area.

In a similar manner as in the first embodiment described above, a flag is added to the forwarded indication EWI/CFW in the exchange associated with the redirected line, that is to say in this case the exchange TVSt(B1), the flag identifying the indication as a forwarded indication and preventing any rejection by the screening list of authorized originators for the mobile telephone B2. Likewise, in a similar manner as in the embodiment described above, if the EWI/CFW is successfully forwarded to the originating A-subscriber, a type of acknowledgment signal SIG/CFW is transmitted which triggers appropriate display (symbolized in FIG. 2 as a vertically hatched area on the screen on the personal computer) on the A-subscriber's terminal PC(A). (In the interests of clarity, the "alternative route" via the mailbox is not shown in FIG. 2).

In both embodiments, the B-subscriber informed about the arrival of a voice message or e-mail by the forwarded Message Waiting Indication MWI/CFW or E-mail Waiting Indication EWI/CFW may, in a manner which is known per se and is, therefore, not explained in more detail here, retrieve the voice message stored in the T-box or the e-mail stored on the appropriate Internet server MSe immediately. The proposed solution, thus, provides him/her with the same options, in terms of messages stored in the network, on a forwarding line as on a standard line.

The technical network implementation is described in ETSI documents ETS 300 745 and ETS 300 754 and relates to the ISDN signaling for the terminal in the D-channel protocol (layer 3 FACILITY reporting) and to the network signaling (TCAP) between the exchanges. In this respect, this signaling has been defined and need only be complemented by the flag in order to identify the forwarding of the MWI/EWI. The signaling should be based generally on the existing standard and should only additionally take into account the call forwarding as an interworking case.

As a third exemplary embodiment of the present invention, FIG. 3 shows a configuration involving storage of a voice message in the T-box of an ISDN network, the configuration being similar to the arrangement shown in FIG. 1 to a certain degree. In the present case, it is assumed that an A-subscriber transmits a message to a B-subscriber associated with a mobile telephone A which is connected to a terminal B1 associated with the B-subscriber via the competent base station BS(A), the appropriate mobile switching center MSC(A) in the mobile radio network GSM, an interface (an access mobile exchange) INT between the mobile radio network GSM and a landline network ISDN, via the landline network itself, an exchange TVSt(B1) and a network termination unit NT(B1).

Again, it is assumed that the B-subscriber has set, on his/her terminal B1, for example in his/her office, a voice memory function implemented via the landline network ISDN (i.e., via the voice memory server T-box therein). As in the embodiment shown in FIG. 1, when the call from the A-subscriber arrives, the voice memory function is, therefore, activated and a message transmitted by the A-subscriber is stored in the T-box. It is also assumed that, when setting the voice memory mode, the B-subscriber has prescribed that a Message Waiting Indication MWI be sent to a second line B2; for example, his/her private line.

This line is produced via a second exchange TVSt(B2) in the form of a private branch exchange TK(B2). The private branch exchange TK(B2) is primarily programmed such that the Message Waiting Indication MWI appears on the display on a first connected terminal B2a, which is in the B-subscriber's study at home, for example. However, seeing the good weather, the B-subscriber has decided to leave his/her study in order to start working in the garden, and he/she takes a cordless telephone B2b with him/her as another terminal connected to the private branch exchange TK(B2). To this end, he/she has set unconditional call forwarding to his/her cordless telephone B2b internally in his/her private branch exchange, which unconditional call forwarding, in accordance with one development of the inventive concept, also includes redirection of an incoming Message Waiting Indication in the form of a redirected Message Waiting Indication MWI/CFW to the cordless telephone B2b. In this context, it is not necessary to set a specific flag, since no screening list of authorized originators is implemented in the private branch exchange. In the example shown, it is also assumed that signaling of the (internal) call forwarding back to the A-subscriber is not provided.

SIEMENS (EWSD—digital electronic switching system) has also implemented MWI for analog subscriber lines. Since analog subscribers currently still make up the great majority in the network, they should also be able to forward the MWI/EWI. For this reason, the proposed feature is not limited to specific signaling, such as ISDN or GSM, but rather can be used generally for a public telephone network (PSTN).

Although the present invention has been described with reference to specific embodiments, those of skill in the art will recognize that changes may be made thereto without departing from the spirit and scope of the invention as set forth in the hereafter appended claims.

What is claimed is:

1. A public telephone network having a subscriber line for which an additional service feature of call forwarding to a predetermined destination call number is provided, the call forwarding being designed for forwarding an indication, the indication being at least one of a message waiting indication and an e-mail waiting indication, the public telephone network including at least one of exchanges and service switching points comprising:

parts for checking a presence of call forwarding on an associated subscriber line in response to a reception of an indication on the subscriber line;

parts for linking the indication to the call forwarding destination call number;

parts for forwarding the indication to at least one of the exchange responsible for the destination call number and the competent service switching point; and parts for setting a call forwarding flag for the indication arriving via call forwarding for preventing rejection of the indication on a line of the destination call number.

2. A public telephone network as claimed in claim 1, wherein the public telephone network is a land lying network provided with an interface to a mobile radio network, the interface being designed for forwarding the indication into the mobile radio network.

3. A public telephone network as claimed in claim 1, wherein the public telephone network is a mobile radio network provided with an interface to one of a land lying network and another mobile radio network, the interface being designed for forwarding the indication into, respectively, the land lying network and the mobile radio network.

4. A public telephone network as claimed in claim 1, further comprising signaling parts for acknowledging the forwarding of the indication to a mailbox.

5. A public telephone network as claimed in claim 4, wherein the signaling parts report an error when forwarding the indication to the mailbox.

* * * * *